United States Patent
Maurer et al.

(10) Patent No.: US 9,488,285 B2
(45) Date of Patent: Nov. 8, 2016

(54) LINE PRESSURE VALVE TO SELECTIVELY CONTROL DISTRIBUTION OF PRESSURIZED FLUID

(71) Applicant: Eaton Corporation, Cleveland, OH (US)

(72) Inventors: Adam C. Maurer, Portage, MI (US); Jerry J. Brittan, Mattawan, MI (US); Robert J. Kanda, Lake Orion, MI (US); Darren Firth, West Pennant Hills (AU); Melissa M. Koenig, Howell, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/812,050

(22) Filed: Jul. 29, 2015

(65) Prior Publication Data

US 2015/0330519 A1 Nov. 19, 2015

Related U.S. Application Data

(63) Continuation-in-part of application No. 13/553,491, filed on Jul. 19, 2012, now Pat. No. 9,115,731, which (Continued)

(51) Int. Cl.
*F16H 61/448* (2010.01)
*F15B 13/04* (2006.01)
(Continued)

(52) U.S. Cl.
CPC .......... *F16K 11/04* (2013.01); *B67D 7/70* (2013.01); *F15B 11/0426* (2013.01); *F15B 11/17* (2013.01); *F15B 13/0402* (2013.01); *F16H 61/0025* (2013.01); *F16H 61/0206* (2013.01); *F16H 61/448* (2013.01); *F15B 2013/0412* (2013.01); *F15B 2211/20538* (2013.01);

(Continued)

(58) Field of Classification Search
CPC ............... F15B 11/17; F15B 2211/71; F15B 2211/30525; F15B 2211/20584; F15B 2211/20592; F16H 61/448; F16H 2061/0037; F16K 11/07; Y10T 137/86662; Y10T 137/86163; Y10T 137/87772; Y10T 137/86131; Y10T 137/86574; Y10T 137/8671
USPC ............ 137/565.29, 565.33, 625.24, 625.69, 137/625.2, 870
See application file for complete search history.

(56) References Cited

U.S. PATENT DOCUMENTS 3,273,467 A * 9/1966 Allen ...................... F15B 13/01
137/596.2
4,819,430 A 4/1989 Becker
(Continued)

FOREIGN PATENT DOCUMENTS

EP 1881222 A1 1/2008
WO WO-2004092618 A1 10/2004

*Primary Examiner* — Atif Chaudry
(74) *Attorney, Agent, or Firm* — Fishman Stewart PLLC

(57) ABSTRACT

A line pressure valve includes a valve housing having a central cavity and a plurality of inlet and outlet ports, and a spool positioned within the central cavity and axially displaceable therein, the spool having a plurality of radial cutouts that fluidly connect respective inlet and outlet ports based on an axial position of the spool with respect to the valve housing. First and second pumps are fluidly connectable and disconnectable respectively to and from the fluid circuit based on the axial position of the spool via the inlet and outlet ports.

18 Claims, 11 Drawing Sheets

Related U.S. Application Data is a continuation-in-part of application No. 13/279,939, filed on Oct. 24, 2011.

(60) Provisional application No. 62/140,577, filed on Mar. 31, 2015.

(51) Int. Cl.
  *F15B 11/042* (2006.01)
  *F15B 11/17* (2006.01)
  *F16H 61/02* (2006.01)
  *F16K 11/04* (2006.01)
  *B67D 7/70* (2010.01)
  *F16H 61/00* (2006.01)

(52) U.S. Cl.
  CPC . *F15B2211/20592* (2013.01); *F15B 2211/265* (2013.01); *F15B 2211/30525* (2013.01); *F15B 2211/30595* (2013.01); *F15B 2211/62* (2013.01); *F15B 2211/71* (2013.01); *F16H 2061/0037* (2013.01); *F16H 2061/0279* (2013.01); *Y10T 137/0318* (2015.04); *Y10T 137/8671* (2015.04); *Y10T 137/86107* (2015.04); *Y10T 137/86131* (2015.04); *Y10T 137/86163* (2015.04); *Y10T 137/86574* (2015.04); *Y10T 137/86662* (2015.04); *Y10T 137/86879* (2015.04); *Y10T 137/87772* (2015.04)

(56) References Cited

U.S. PATENT DOCUMENTS

| | | | |
|---|---|---|---|
| 5,113,894 A * | 5/1992 | Yoshida | F15B 11/0445 137/106 |
| 6,358,181 B1 * | 3/2002 | Friedmann | F16H 61/662 477/37 |
| 6,361,287 B1 * | 3/2002 | Hopper | F04B 17/05 417/286 |
| 7,086,366 B1 * | 8/2006 | Killion | F01M 1/02 123/192.2 |
| 8,376,906 B2 | 2/2013 | Koenig et al. | |
| 8,572,958 B2 | 11/2013 | Grethel et al. | |
| 8,668,465 B2 | 3/2014 | Wadsley et al. | |
| 2005/0143881 A1 * | 6/2005 | Taulbut | F02D 41/2435 701/29.6 |
| 2008/0164115 A1 | 7/2008 | Grethel | |
| 2008/0179158 A1 | 7/2008 | De Maziere | |
| 2009/0250128 A1 * | 10/2009 | Emmons | F16H 61/0031 137/625.11 |
| 2010/0204008 A1 | 8/2010 | Azuma et al. | |
| 2010/0281859 A1 | 11/2010 | Oka | |
| 2010/0287924 A1 | 11/2010 | Dostal et al. | |
| 2011/0120568 A1 | 5/2011 | Borntraeger et al. | |
| 2013/0037144 A1 * | 2/2013 | Fuller | F16H 61/0025 137/565.29 |

* cited by examiner

LINE PRESSURE VALVE TO SELECTIVELY CONTROL DISTRIBUTION OF PRESSURIZED FLUID

CROSS REFERENCE TO RELATED APPLICATIONS

This application is a continuation-in-part of U.S. patent application Ser. No. 13/553,491, filed on Jul. 19, 2012, which is a continuation-in-part of U.S. patent application Ser. No. 13/279,939, filed on Oct. 24, 2011, and this application claims priority to Provisional Patent Application 62/140,577 filed Mar. 31, 2015, which are hereby incorporated by reference in their entirety.

BACKGROUND

A hydraulic system may include a variety of hydraulically actuated components, each of which may have different flow and pressure requirements that can vary over time. The hydraulic system may include a pump for supplying a flow of pressurized fluid to the hydraulic components. The pump may have a variable or fixed displacement configuration. Fixed displacement pumps are generally smaller, lighter, and less expensive than variable displacement pumps. Generally speaking, fixed displacement pumps deliver a finite volume of fluid for each cycle of pump operation. The output volume of a fixed displacement pump can be controlled by adjusting the speed of the pump. The pump may be sized to satisfy a maximum flow requirement of the hydraulic system. Closing or otherwise restricting the outlet of a fixed displacement pump will generally cause a corresponding increase in the system pressure. To avoid over pressurizing the hydraulic system, fixed displacement pumps typically utilize a pressure regulator or an unloading valve to control the pressure level within the system during periods in which the pump output exceeds the flow requirements of the hydraulic components. The pressure regulator or unloading valve operates to redirect the excess fluid back to a hydraulic system sump to be re-pressurized by the pump. This method of controlling system pressure and flow may result in a significant reduction in the operating efficiency of the hydraulic system depending on the duration and magnitude of excess pump flow. The hydraulic system may further include various valves for controlling the distribution of the pressurized fluid to various hydraulic components.

DETAILED DESCRIPTION

Figure 1:
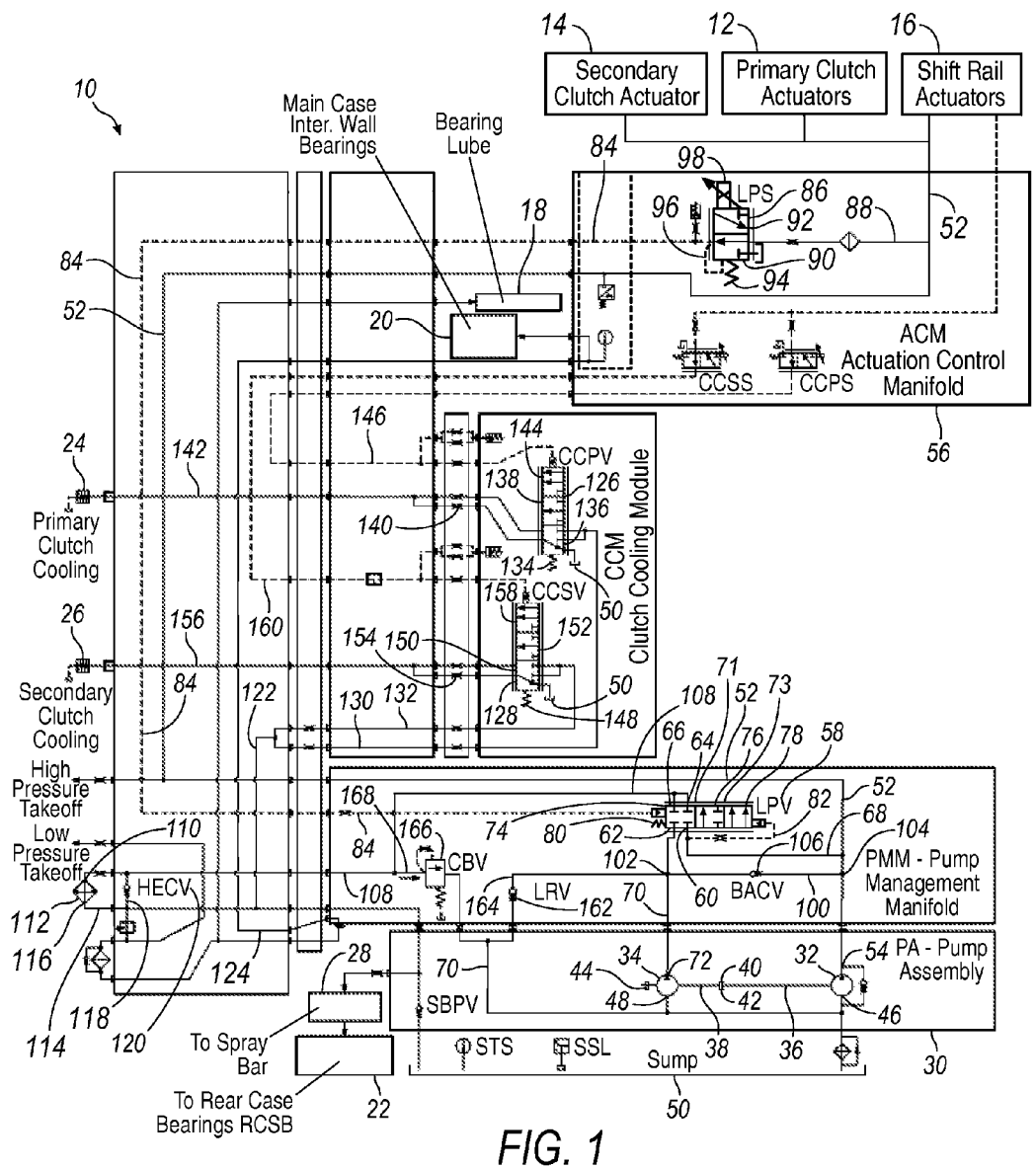
FIG. 1 is a schematic illustration of an exemplary hydraulic system employing dual pumps for supply pressurized fluid to a high-pressure circuit and a low-pressure circuit.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

FIG. 1 schematically illustrates an exemplary pressurized fluid distribution system 10 operable for selectively distributing a pressurized fluid to various hydraulically actuated components. Fluid distribution system 10 may have various configurations depending on the requirements of a particular application. For example, the exemplary fluid distribution systems illustrated in FIGS. 1-6 are configured for use in automotive transmission applications. The illustrated fluid distribution systems operate to distribute pressurized fluid for use in activating clutches, initiating gearshifts, and providing clutch cooling and lubrication, as well as providing other functions.

Fluid distribution system 10 may include multiple hydraulic circuits for selectively distributing the pressurized fluid to various hydraulically actuated components associated with the respective hydraulic circuits. Fluid distribution system 10 may generally include a high-pressure circuit having a high-pressure fluid passage 52 and a low-pressure circuit having a low-pressure fluid passage 108, although in practice fewer or more hydraulic circuits may be provided depending on the requirements of a particular application. Pressurized fluid distributed by the high-pressure circuit may be used, for example, to actuate hydraulic components that generally have high pressure and low flow requirements, such as primary clutch actuator 12, secondary clutch actuator 14 and shift rail actuators 16. Pressurized fluid distributed by the low-pressure circuit may provide lubrication for bearings, including, for example, various transmission bearings 18, main case intermediate wall bearings 20 and rear case bearings 22, and provide cooling of clutches, such as primary clutch 24 and secondary clutch 26. The pressurized fluid from the low-pressure circuit may also be discharged through spray bar 28 to provide lubrication for transmission gears. Lubrication and cooling functions typically have higher flow and lower pressure requirements than other functions, such as clutch and shift rail actuation.

The terms high-pressure circuit and low-pressure circuit merely identify the respective fluid circuits for purposes of discussion, and are not intended to denote an actual pressure level that may occur within the respective fluid circuits, or that the high-pressure circuit will always operate at a higher pressure level than the low-pressure circuit. Although, the high-pressure circuit generally operates at a higher pressure level than the low pressure circuit, there may be certain operating conditions under which the pressure level within the low-pressure circuit approaches or exceeds that of the high pressure circuit. It is not necessary that the high-pressure circuit continually operate at a higher pressure than the low-pressure circuit under all operating conditions.

With continued reference to FIG. 1, a pump assembly 30 may provide pressurized fluid for distribution by the high-pressure circuit and the low-pressure circuit. Pump assembly 30 may include one or more pumps. The illustrated exemplary configuration includes two pumps, but additional pumps may also be employed depending on the design and performance requirements of a particular application. Pump assembly 30 may include a first pump 32 and a second pump 34. First pump 32 and second pump 34 may be selectively fluidly connected, either individually or in combination, to the high-pressure circuit and the low-pressure circuit depending on the flow requirements of the particular fluid circuit. Generally the output flow from second pump 34 will be directed to the low-pressure circuit to provide lubrication for gears and bearings, and cooling for clutches, whereas the output flow from first pump 32 will be directed to the high-pressure circuit for actuating shift rails and clutches. Certain operations, however, such as clutch actuation and shift rail actuation, may include brief periods during which the flow requirement of the high-pressure circuit exceeds the flow output of first pump 32. The additional flow may be satisfied by temporarily directing at least a portion of the fluid output from second pump 34 to the high-pressure circuit. During this period, at least a portion of the fluid flow from second pump 34 may be diverted away from the low-pressure circuit. Once the excess flow requirement of the high-pressure circuit has abated, the diverted flow from second pump 34 may once again be directed to the low-pressure circuit. There may also be periods during which the flow requirement of the high-pressure circuit is less than the flow output of first pump 32. During these periods at least a portion of the excess flow output from first pump 32 may be directed to the low-pressure circuit. When the flow requirement of the high-pressure circuit increases the flow from first pump 32 may be redirected back to the high-pressure circuit.

First pump 32 may be mounted to a first drive shaft 36 and second pump 34 may be mounted to a second drive shaft 38. First drive shaft 36 may be fixedly connected to second drive shaft 38 via a coupling 40 to enable first pump 32 and second pump 34 to rotate in unison, and thus be operated at substantially the same speed (e.g., revolutions per minute (rpm)). Alternatively, first drive shaft 36 and second drive shaft 38 may be interconnected via a suitably configured gear box 42 to enable the first and second pumps to rotate at a selected fixed speed ratio relative to one another. First drive shaft 36 and second drive shaft 38 may also be integrated as a single shaft. First drive shaft 36 and second drive shaft 38 may be connected to an external power source 44, such as an engine, electric motor, or other power source capable of outputting a rotational torque. An inlet port 46 of first pump 32 and an inlet port 48 of second pump 34 may be fluidly connected to a fluid sump 50 that provides a source of hydraulic fluid for the pumps.

First pump 32 and second pump 34 may include any of a variety of known fixed displacement pumps, including but not limited to, gear pumps, vane pumps, axial piston pumps, and radial piston pumps. The pumps may be substantially the same size, or have a different size. The size of a fixed displacement pump may be defined in terms of its fluid output rate when operated at a particular speed (e.g., revolutions per minute (rpm)). Increasing the size of the pump generally produces a corresponding increase in the fluid output rate of the pump. For example, a first pump capable of outputting 5 Liters/minute when operated at a speed of 1000 rpm is considered to be smaller than a second pump capable of outputting 6 Liters/minute when operated at the same speed. First pump 32 will generally be sized smaller than second pump 34 (i.e., produce a lower flow output at a given operating speed) due to the high pressure circuit typically having lower flow and higher pressure requirements than the low pressure circuit. In practice, first pump 32 may be sized larger than second pump 34, or both pumps may have substantially the same size. First pump 32 and second pump 34 may be operated at substantially the same speed.

Continuing to refer to FIG. 1, the high-pressure circuit may include a high-pressure fluid passage 52 fluidly connected to a discharge port 54 of first pump 32. Pressurized fluid output from first pump 32 may be directed through high-pressure fluid passage 52 to an actuation control manifold 56 (ACM), which operates to direct the pressurized fluid to the desired hydraulic components, for example, shift rail actuators 16, primary clutch actuator 12 and secondary clutch actuator 14.

With continued reference to FIG. 1, a line-pressure valve 58 (LPV) may be provided to selectively control distribution of pressurized fluid from first pump 32 and second pump 34 between the high-pressure circuit and the low-pressure circuit. This may enable more efficient use of the pumps and enable the pumps to be sized smaller than generally would be required if each pump were sized to satisfy the maximum flow requirement of the respective fluid circuit. Smaller pumps generally require less power to operate than larger pumps. For example, first pump 32 and second pump 34 may be sized to accommodate the pressure and flow requirements predominantly occurring within the respective high pressure circuit and low pressure circuit, which is typically less, and may be significantly less, than the respective fluid circuit's maximum pressure and flow requirement. During instances in which the flow and/or pressure requirement of a particular fluid circuit exceeds the output of the corresponding pump, at least a portion of the fluid from the pump supplying the other fluid circuit may be temporarily diverted to the fluid circuit requiring the additional flow to satisfy the deficiency. Once the excess flow requirement has subsided, the additional flow may be redirected back to the other fluid circuit. The ability to selectively distribute the fluid output from first pump 32 and second pump 34 may allow the use of smaller pumps having lower power consumption, which may increase the overall efficiency of the fluid distribution system.

Line-pressure valve 58 may be configured as a pilot controlled three-way four-port valve having a high-pressure inlet port 60, a low-pressure inlet port 62, a high-pressure discharge port 64 and a low-pressure discharge port 66.

Line-pressure valve 58 may be operated to selectively fluidly connect low-pressure inlet port 62 to low pressure discharge port 66, and to selectively fluidly connect high pressure inlet port 60 to high-pressure discharge port 64. Although line-pressure valve 58 is illustrated as a pilot controlled three-way four-port valve, it shall be appreciated that other valve configurations may also be used depending on the particular application.

Line-pressure valve 58 may be fluidly connected to first pump 32 through a high-pressure supply passage 68 fluidly connecting high-pressure inlet port 60 of line-pressure valve 58 to high-pressure fluid passage 52. Line-pressure valve 58 may be fluidly connected to second pump 34 by way of a low-pressure supply passage 70 fluidly connecting a discharge port 72 of second pump 34 to low-pressure inlet port 62 of line-pressure valve 58.

To control distribution of pressurized fluid from first pump 32 and second pump 34 between the high-pressure and low-pressure circuits, line-pressure valve 58 may be selectively arranged in any of three positions 74, 76 and 78. Line-pressure valve 58 is illustrated arranged in first position 74 in FIGS. 1 and 2, in second position 76 in FIG. 3, and in third position 78 in FIG. 4. Arranging line-pressure valve 58 in first position 74 substantially blocks pressurized fluid from flowing between low-pressure inlet port 62 and low-pressure discharge port 66, and between high-pressure inlet port 60 and high pressure-discharge port 64. Arranging line-pressure valve 58 in second position 76 fluidly connects low-pressure inlet port 62 to low-pressure discharge port 66, while substantially blocking the flow of fluid between high-pressure inlet port 60 and high-pressure discharge port 64. Arranging line-pressure valve 58 in third position 78 fluidly connects low-pressure inlet port 62 to low-pressure discharge port 66 and high-pressure inlet port 60 to high pressure discharge port 64.

Line-pressure valve 58 may also be configured for variable output, which may be enabled by arranging line-pressure valve 58 at one or more intermediate positions 71, 73 between first position 74 and third position 78. For example, arranging line-pressure valve 58 between first position 74 and second position 76 fluidly connects low-pressure inlet port 62 to low-pressure discharge port 66 and substantially blocks the flow of fluid between high-pressure inlet port 60 and high-pressure discharge port 64. Arranging line-pressure valve 58 between first position 74 and second position 76 restricts fluid flow between low-pressure inlet port 62 and low pressure discharge port 66 to something less than would occur with the valve is arranged in second position 76. The fluid flow path between low-pressure inlet port 62 and low-pressure discharge port 66 is substantially fully open when line-pressure valve 58 is arranged in second position 76, and is substantially closed when the valve is arranged in first position 74. The fluid flow path between low-pressure inlet port 62 and low-pressure discharge port 66 generally becomes more restrictive as line-pressure valve 58 is moved away from second position 76 and toward first position 74. Generally the fluid flow path between high-pressure inlet port 60 and high-pressure discharge port 64 remains substantially blocked over the entire range between and including first position 74 and second position 76.

Arranging line-pressure valve 58 between second position 76 and third position 78 restricts fluid flow between high-pressure inlet port 60 and high-pressure discharge port 64 to something less than when the valve is arranged in third position 78. The fluid flow path between high-pressure inlet port 60 and high-pressure discharge port 64 is substantially fully open when line-pressure valve 58 is arranged in third position 78, and is substantially closed when the valve is arranged in second position 76. The fluid flow path between high-pressure inlet port 60 and high-pressure discharge port 64 generally becomes less restrictive as line-pressure valve 58 is moved away from second position 76 and toward third position 78. Generally the fluid flow path between low-pressure inlet port 62 and low-pressure discharge port 66 remains substantially fully open over the entire range between and including second position 76 and third position 78.

With continued reference to FIG. 1, a biasing member 80 biases line-pressure valve 58 toward first position 74, which is the default position. A pressure tap 82 may be provided to detect a pressure level within high-pressure supply passage 68. Pressure tap 82 provides a pilot pressure that tends to move line-pressure valve 58 away from first position 74 and toward third position 78.

A pilot pressure signal for controlling operation of line-pressure valve 58 may be transmitted from actuation control manifold 56 and delivered to line-pressure valve 58 through a pilot signal passage 84. The pilot signal operates in conjunction with biasing member 80 to move line-pressure valve 58 toward first position 74 and away from third position 78. Line-pressure valve 58 will generally not begin to move back toward first position 74 and away from third position 78 until the pilot pressure supplied by pressure tap 82 exceeds the combined biasing force exerted by biasing member 80 and supplied by pilot signal passage 84.

The pilot signal may be controlled by a line pressure solenoid valve 86 (LPS), which operates to generate the pilot signal by selectively fluidly connecting pilot signal passage 84 to high-pressure fluid passage 52 through a pilot pressure supply passage 88. Line pressure solenoid valve 86 may be configured as a three-way two-position valve, and may be selectively arranged in a first position 90 for fluidly connecting pilot pressure supply passage 88 to pilot signal passage 84, and a second position 92 for fluidly connecting pilot signal passage 84 to fluid sump 50.

Line pressure solenoid valve 86 may be configured for variable output by arranging the valve at one or more intermediate positions between first position 90 and second position 92. A biasing member 94 may be provided to bias line pressure solenoid valve 86 toward first position 90, which is the default position. A pressure tap 96 may also be provided to detect a pressure level within pilot signal passage 84. Pressure tap 96 provides a pilot pressure that operates in conjunction with biasing member 94 to bias line pressure solenoid valve 86 toward first position 90.

Line pressure solenoid valve 86 may include a solenoid 98 selectively operable to bias line pressure solenoid valve 86 toward second position 92 and away from first position 90 in response to a signal received from a controller, such as, for example, a transmission control module (TCM) or a transmission control unit (TCU). Solenoid 98 may be configured as a variable force solenoid or a variable bleed solenoid, by way of example. Activating solenoid 98 biases line pressure solenoid valve 86 toward second position 92 and away from first position 90. Line pressure solenoid valve 86 will generally be arranged in the default first position 90 when solenoid 98 is deactivated.

With continued reference to FIG. 1, second pump 34 may be selectively fluidly connected to high-pressure fluid passage 52 by way of a blocking actuation passage 100. One end of blocking actuation passage 100 may be fluidly connected to low-pressure supply passage 70 upstream of line-pressure valve 58 at a fluid junction 102, and an opposite end fluidly connected to high-pressure fluid passage 52 at a fluid junction 104. Blocking actuation passage 100 may include a blocking actuation check valve 106 (BACV) operable to substantially block fluid present within the high-pressure circuit from flowing through blocking actuation passage 100 to low-pressure supply passage 70 under all operating conditions and regardless of the positioning of line-pressure valve 58. Blocking actuation check valve 106 may be configured to allow pressurized fluid from second pump 34 to pass through the valve to the high-pressure circuit when a predetermined pressure drop across blocking actuation check valve 106 is exceeded. The pressure drop being such that the pressure within low-pressure supply passage 70 is greater than the pressure within high-pressure fluid passage 52. Blocking actuation check valve 106 may be configured as a check valve.

Blocking actuation check valve 106 may be configured to be infinitely moveable between a fully closed position, in which fluid output from second pump 34 is substantially blocked from passing through the valve to high-pressure fluid passage 52, and a fully open position, in which substantially all or a portion of the fluid output from second pump 34 is allowed to pass through the valve to high-pressure fluid passage 52. Blocking actuation check valve 106 may be configured to operate in response to a pressure drop occurring across the check valve. For example, blocking actuation check valve 106 may be configured to commence opening at a predetermined minimum pressure drop occurring across the valve. Further increasing the pressure drop causes blocking actuation check valve 106 to further open, thereby increasing the flow rate through the valve from low-pressure supply passage 70 to high-pressure fluid passage 52.

Arranging line-pressure valve 58 in either second position 76 or third position 78 allows pressurized fluid from second pump 34 to flow to the low-pressure circuit through a low-pressure fluid passage 108, which may be fluidly connected to high-pressure discharge port 64 and low-pressure discharge port 66 of line-pressure valve 58. Low-pressure fluid passage 108 may be fluidly connected to an inlet port 110 of a heat exchanger 112. Heat exchanger 112 may include various configurations, including but not limited to, a water to oil heat exchanger. When configured as a water to oil heat exchanger, a portion of the heat contained within the pressurized fluid passing through heat exchanger 112 may be transferred to water flowing over the heat exchanger.

A heat exchanger discharge passage 114 may be fluidly connected to a discharge port 116 of heat exchanger 112. A heat exchanger bypass passage 118 may be provided to allow the pressurized fluid to bypass heat exchanger 112, should the heat exchanger become clogged or otherwise restrict the flow of fluid through the heat exchanger. Heat exchanger bypass passage 118 may include a heat exchanger check valve 120 (HECV) for limiting a pressure drop across heat exchanger 112. Heat exchanger check valve 120 senses a pressure drop across heat exchanger 112 and may be configured to open when the pressure drop exceeds a predetermined magnitude.

Pressurized fluid discharged from heat exchanger 112 may be used to provide lubrication for bearings 18, 20 and 22, and delivered to spray bar 28 for lubricating gears. Pressurized fluid not used for bearing and gear lubrication may provide cooling for a primary clutch 24 and a secondary clutch 26. Pressurized fluid for clutch cooling may be diverted to primary clutch 24 and secondary clutch 26 through a clutch cooling supply passage 122 fluidly connected to heat exchanger discharge passage 114 at a fluid junction 124.

Distribution of pressurized fluid between primary clutch 24 and secondary clutch 26 may be selectively controlled by a clutch cooling primary valve 126 (CCPV) and a clutch cooling secondary valve 128 (CCSV). Clutch primary cooling valve 126 may be fluidly connected to clutch cooling supply passage 122 through a CCPV supply passage 130. Clutch secondary cooling valve 128 may be fluidly connected to clutch cooling supply passage 122 through a CCSV supply passage 132. Clutch cooling primary valve 126 is operable to control the flow of pressurized cooling fluid to primary clutch 24, and clutch cooling secondary valve 128 is operable to control the flow of pressurized cooling fluid to secondary clutch 26.

Clutch cooling primary valve 126 may be configured as a pilot actuated three-position five-port valve. A biasing member 134 biases clutch cooling primary valve 126 to a default first position 136, in which cooling fluid from primary clutch 26 is allowed to flow back through clutch cooling primary valve 126 and is returned to fluid sump 50. Clutch cooling primary valve 126 is illustrated in FIGS. 1-4 in the default first position 136. Clutch cooling primary valve 126 may also be arranged in an intermediate second position 138, in which pressurized fluid flows through a calibrated orifice 140 to primary clutch 24 through a primary clutch cooling supply passage 142. Clutch cooling primary valve 126 may be arranged in a third position 144, in which pressurized fluid is allowed to flow to primary clutch 24 through calibrated orifice 140 and primary clutch cooling supply passage 142. Third position 144 provides a higher flow rate than second position 138, in which fluid is allowed to flow only through calibrated orifice 140. A pilot pressure signal for controlling operation of clutch cooling primary valve 126 may be provided by a primary clutch actuation pressure received from actuation control manifold 56 and delivered to the valve through a pilot signal passage 146.

Clutch cooling secondary valve 128 may be configured as a pilot actuated three-position five-port valve. A biasing member 148 biases clutch cooling secondary valve 128 to a default first position 150, in which cooling fluid from secondary clutch 26 is allowed to flow back through clutch cooling secondary valve 128 and is returned to fluid sump 50. Clutch cooling secondary valve 128 is illustrated in the default first position 150 in FIGS. 1-6. Clutch cooling secondary valve 128 may also be arranged in an intermediate second position 152, in which pressurized fluid flows through a calibrated orifice 154 to secondary clutch 26 through a secondary clutch cooling supply passage 156. Clutch cooling secondary valve 128 may be arranged in a third position 158, in which pressurized fluid is allowed to flow to secondary clutch 26 through orifice 154 and secondary clutch cooling supply passage 156. Third position 158 provides a higher flow rate than second position 152, in which fluid is only allowed to flow through calibrated orifice 154. A pilot pressure signal for controlling operation of clutch cooling secondary valve 128 may be transmitted from actuation control manifold 56 and delivered to the valve through a pilot signal passage 160.

Continuing to refer to FIG. 1, to limit a maximum pressure occurring within the fluid circuit upstream of line-pressure valve 58, particularly when line-pressure valve 58 is arranged in first position 74, a relief valve 162 may be provided to selectively direct at least a portion of pressurized fluid from the circuit back to first pump 32 and second pump 34. Relief valve 162 may be disposed in a fluid path of a relief passage 164 that fluidly connects low-pressure supply passage 70 to inlet port 48 of second pump 34 and inlet port 46 of first pump 32. Relief valve 162 is operable to substantially block fluid from passing from first pump 32 and second pump 34 through relief valve 162 to low-pressure supply passage 70 under all operating conditions. Relief valve 162 may be configured to allow pressurized fluid from low-pressure supply passage 70 to pass through the valve to first pump 32 and second pump 34 when a predetermined pressure drop across relief valve 162 is exceeded.

Relief valve 162 may be configured to be infinitely moveable between a fully closed position, in which fluid from low-pressure supply passage 70 is substantially blocked from passing through the valve to first pump 32 and second pump 34, and a fully open position in which substantially all or a portion of fluid passing through low-pressure supply passage 70 is allowed to pass through the valve to first pump 32 and second pump 34.

Relief valve 162 may be configured to operate in response to a pressure drop occurring across the valve. For example, relief valve 162 may be configured to commence opening at a predetermined minimum pressure drop occurring across the valve. Further increasing the pressure drop causes relief valve 162 to further open, thereby increasing the flow rate through the valve from low-pressure supply passage 70 to first pump 32 and second pump 34.

Continuing to refer to FIG. 1, a clutch backpressure valve 166 (CBV) may be provided to limit a maximum pressure that may occur within the low-pressure circuit. Clutch backpressure valve 166 is operable to selectively direct at least a portion of pressurized fluid from the low-pressure circuit back to first pump 32 and second pump 34 when the pressure within the low-pressure circuit exceeds a predetermined limit. Clutch backpressure valve 166 may be disposed in the fluid path of a clutch backpressure relief passage 168 fluidly connecting heat exchanger inlet port 110 to inlet port 48 of second pump 34 and inlet port 46 of first pump 32. Clutch backpressure valve 166 may be configured to operate in response to a detected pressure within clutch backpressure relief passage 168. For example, clutch backpressure valve 166 may be configured to commence opening when the pressure within clutch backpressure relief passage 168 exceeds a predetermined limit. Further increasing the pressure within clutch backpressure relief passage 168 causes clutch backpressure valve 166 to further open. On the other hand, decreasing the pressure within clutch backpressure relief passage 168 causes the valve to commence closing to reduce the flow of pressurized fluid.

Figure 2:
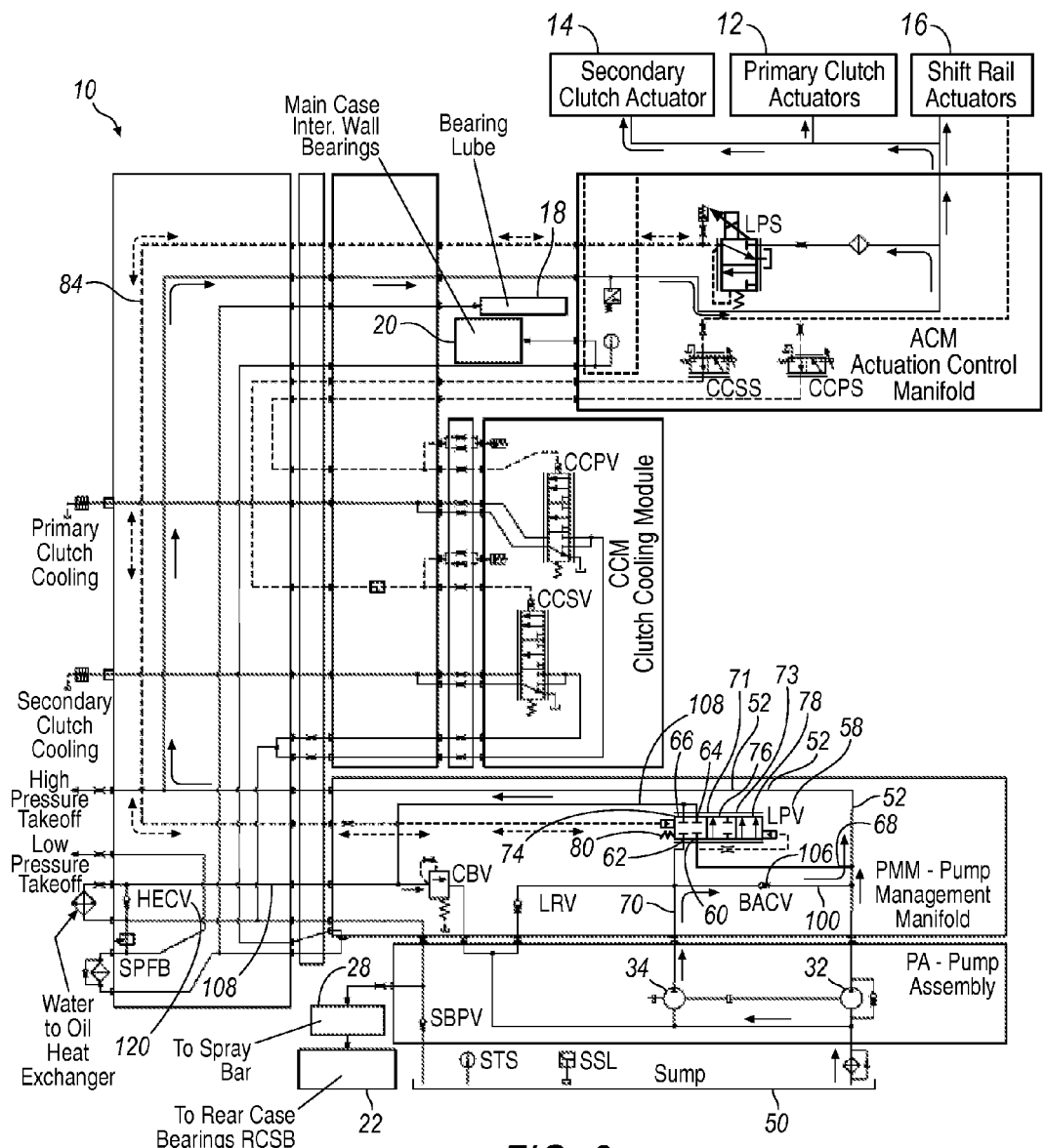
FIG. 2 is a schematic illustration of the exemplary hydraulic system of FIG. 1 operating in a first operating mode.
Figure 3:
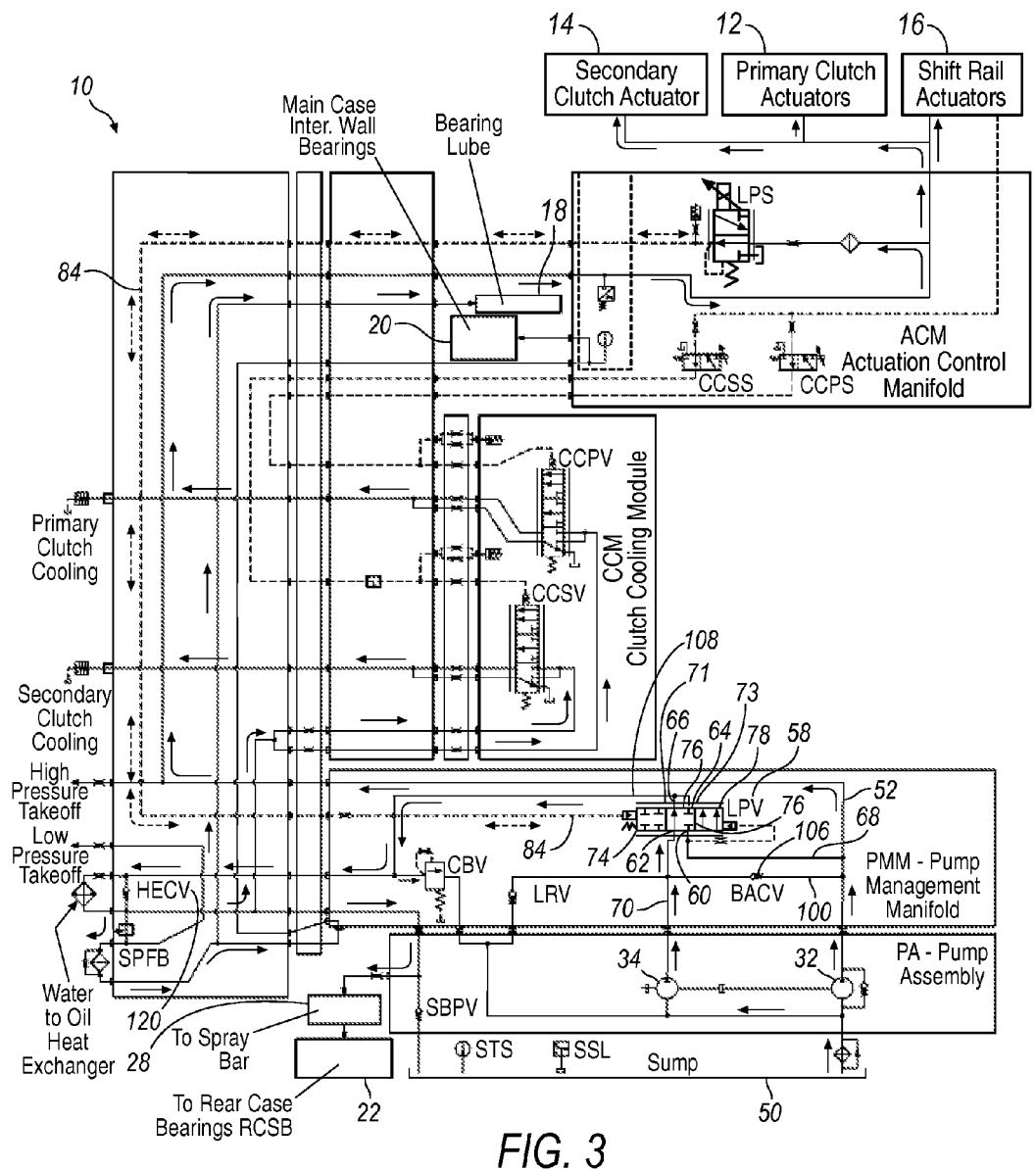
FIG. 3 is a schematic illustration of the exemplary hydraulic system of FIG. 1 operating in a second operating mode.
Figure 4:
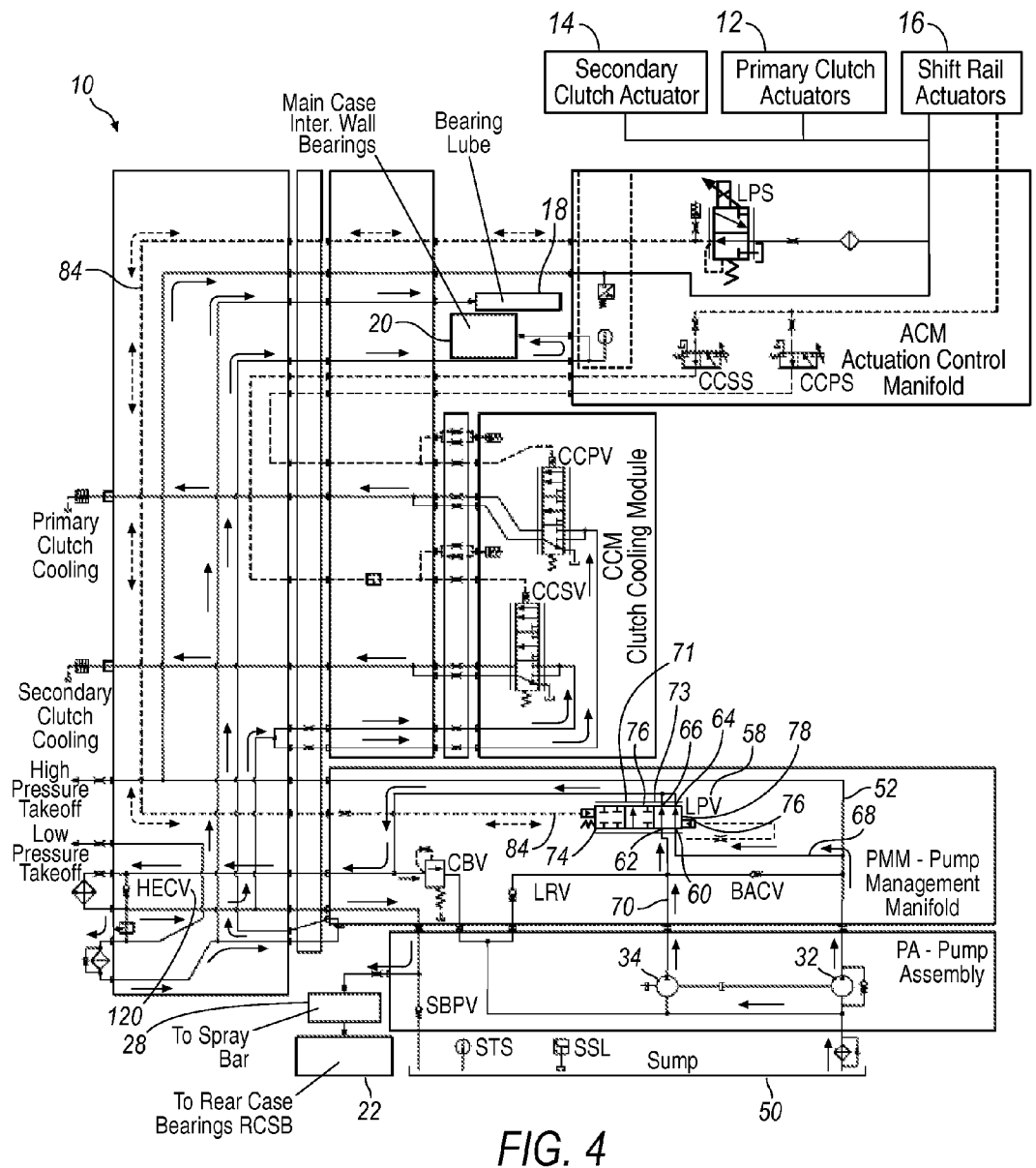
FIG. 4 is a schematic illustration of the exemplary hydraulic system of FIG. 1 operating in a third operating mode.

Operation of pressurized fluid distribution system 10 will now be described with reference to FIGS. 2-6. Pressurized fluid distribution system 10 may generally operate in three different operating modes. A first operating mode has pressurized fluid from first pump 32 and second pump 34 being directed away from the low-pressure circuit and delivered to the high-pressure circuit. A second operating mode has pressurized fluid from first pump 32 delivered to the high-pressure circuit and pressurized fluid from second pump 34 delivered to the low-pressure circuit. A third operating mode has pressurized fluid from second pump 34 and at least a portion of the pressurized fluid from first pump 32 delivered to the low-pressure circuit. The first operating mode may be selected by arranging line-pressure valve 58 in first position 74. The second operating mode may be selected by arranging line-pressure valve 58 in second position 76. The third operating mode may be selected by arranging line-pressure valve 58 in third position 78. FIG. 2 illustrates the fluid path traveled by the pressurized fluid when operating fluid distribution system 10 in the first operating mode. FIG. 3 illustrates the fluid path traveled by the pressurized fluid when operating fluid distribution system 10 in the second operating mode. FIG. 4 illustrates the fluid path traveled by the pressurized fluid when operating fluid distribution system 10 in the third operating mode.

Figure 5:
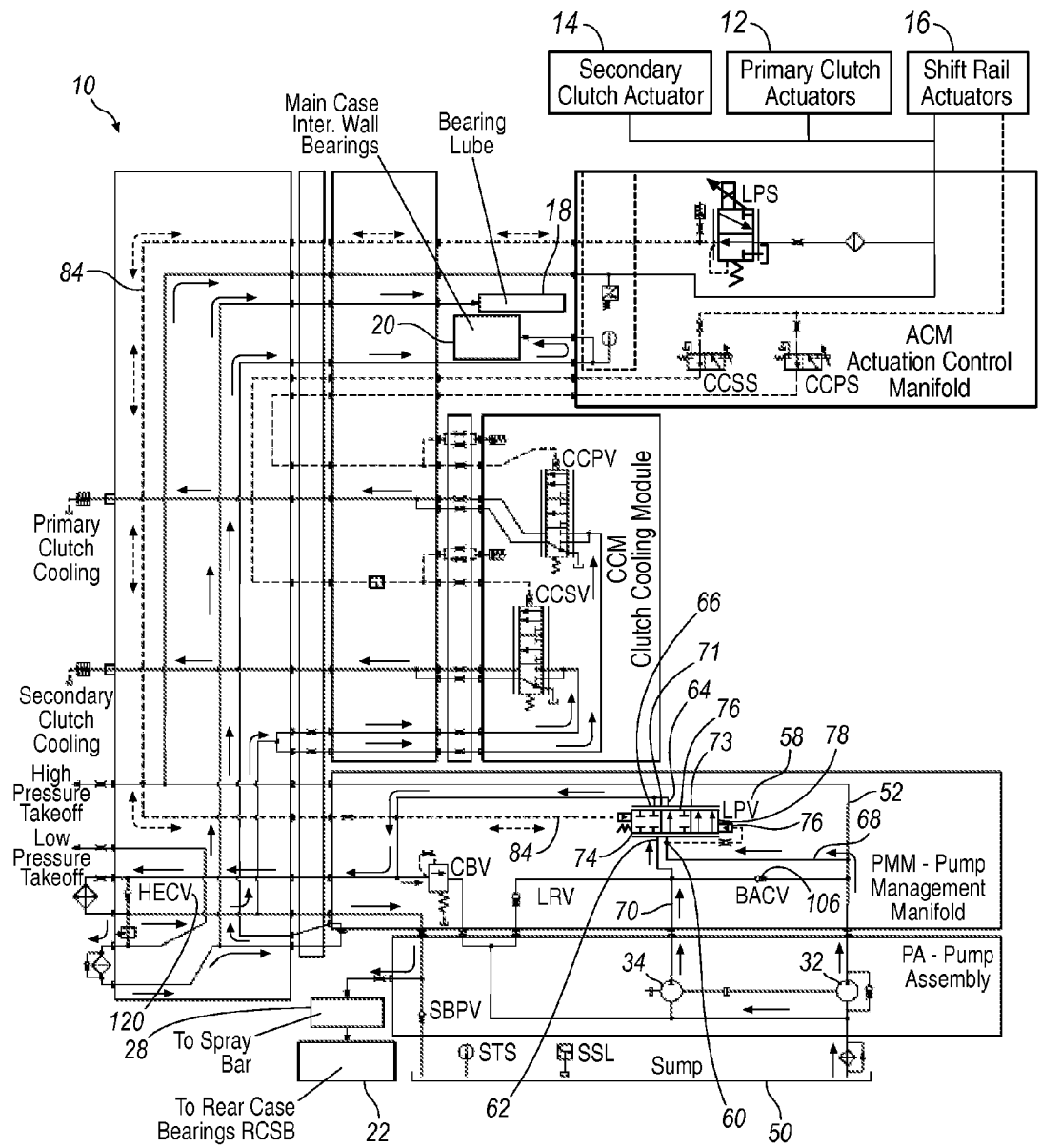
FIG. 5 is a schematic illustration of the exemplary hydraulic system of FIG. 1 operating in a fourth operating mode.
Figure 6:
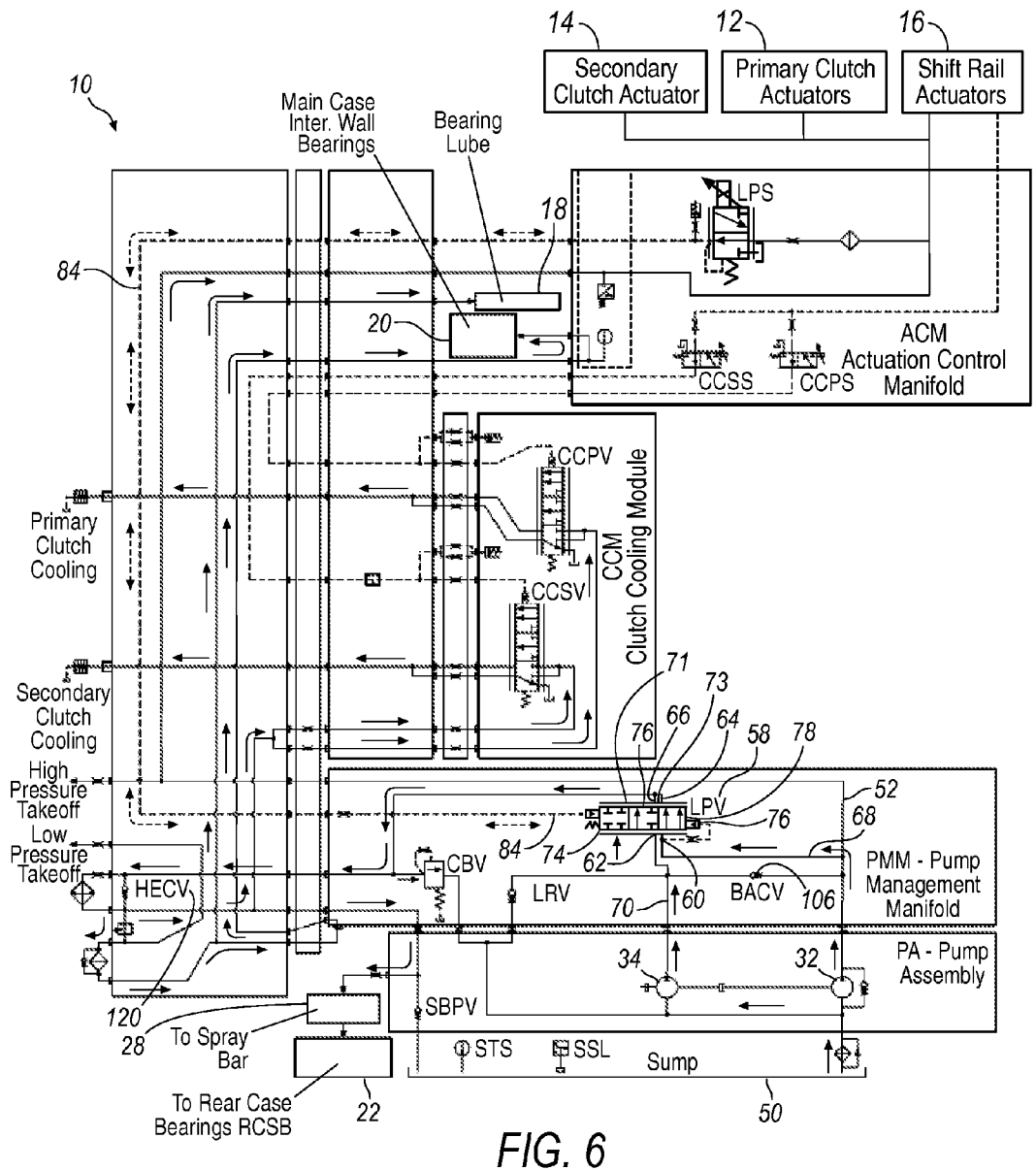
FIG. 6 is a schematic illustration of the exemplary hydraulic system of FIG. 1 operating in a fifth operating mode.

Arranging line-pressure valve 58 in the intermediate position 71 between first position 74 and second position 76 causes the fluid output from second pump 34 to be apportioned between the high pressure circuit and the low-pressure circuit and the entire fluid output from first pump 32 to be delivered to the high-pressure circuit. Such an arrangement represents a fourth operating mode, as illustrated in FIG. 5. Arranging line-pressure valve 58 in the intermediate position 73 between second position 76 and third position 78 causes the fluid output from first pump 32 to be apportioned between the high pressure circuit and the low-pressure circuit and the entire fluid output from second pump 34 to be delivered to the low-pressure circuit. Such an arrangement represents a fifth operating mode, as illustrated in FIG. 6.

Arranging line-pressure valve 58 in first position 74 substantially blocks the flow of fluid between low-pressure supply passage 70 and low-pressure fluid passage 108 and may cause substantially the entire fluid output from second pump 34 to travel from low-pressure supply passage 70 through blocking actuation passage 100 to high-pressure fluid passage 52 (as illustrated in FIG. 2). Arranging line-pressure valve 58 in the intermediate position 71 between first position 74 and second position 76, as illustrated in FIG. 5, causes a portion of the pressured fluid from second pump 34 to travel from low-pressure supply passage 70 through blocking actuation passage 100 to high-pressure fluid passage 52, and the remainder of the fluid to travel through line-pressure valve 58 to the low-pressure circuit. Pressurized fluid from first pump 32 is delivered to the high-pressure circuit through high-pressure fluid passage 52 and blocked from being delivered to the low-pressure circuit when line-pressure valve 58 is arranged in any position between and including first position 74 and second position 76. Arranging line-pressure valve 58 in second position 76 fluidly connects low-pressure supply passage 70 to low-pressure fluid passage 108 while substantially blocking the flow of fluid from high-pressure fluid passage 52 to low-pressure fluid passage 108. Arranging line-pressure valve 58 in third position 78 fluidly connects low-pressure supply passage 70 and high-pressure fluid passage 52 to low-pressure fluid passage 108, and causes at least a portion of the pressurized fluid from first pump 32 to flow to the low-pressure circuit and the remaining portion to flow to the high-pressure circuit. Arranging line-pressure valve 58 in the intermediate position 73 between second position 76 and third position 78, as illustrated in FIG. 6, causes the entire fluid output from second pump 34 to be delivered to the low-pressure circuit and the fluid output from first pump 32 to be apportioned between the low-pressure circuit and the high-pressure circuit.

Fluid distribution system 10 will generally operate in the second operating mode (FIG. 3) when the flow output from first pump 32 is sufficient to satisfy the flow requirement of the high-pressure circuit. However, there may be instances in which the flow requirement of the high-pressure circuit temporarily exceeds the flow output of first pump 32. When this occurs, fluid distribution system 10 may be operated in the first operating mode (FIG. 2), or the intermediate fourth operating mode between the first and second operating modes, in which at least a portion of the fluid output from second pump 34 is directed away from the low-pressure circuit and delivered to the high-pressure circuit to satisfy the temporary excess flow requirement. The second operating mode may be reinitiated, and the flow output from second pump 34 directed back to the low-pressure circuit, when the excess flow requirement of the high-pressure circuit no longer exists.

Referring to FIG. 3, the second operating mode may be actuated by arranging line-pressure valve 58 in second position 76, which allows pressurized fluid from second pump 34 to pass through line-pressure valve 58 to the low-pressure circuit. With line-pressure valve 58 arranged in second position 76, the pressure within low-pressure supply passage 70 of the low-pressure circuit will generally be lower than the pressure within high-pressure fluid passage 52 of the high-pressure circuit. This generally results in a pressure delta across blocking actuation check valve 106 that is less than the predetermined pressure delta required to open the check valve, thereby substantially preventing pressurized fluid from second pump 34 from flowing through blocking actuation passage 100 to the high-pressure circuit.

With reference to FIG. 2, the first operating mode may be actuated by arranging line-pressure valve 58 in first position 74, or in a fourth operating mode when in the intermediate position 71 between first position 74 and second position 76, thereby blocking at least a portion of the flow of pressurized fluid from pump 34 to the low-pressure circuit. Blocking actuation check valve 106 controls the flow of fluid from second pump 34 to the high-pressure circuit through blocking actuation passage 100 based on the arrangement of line-pressure valve 58. Arranging line-pressure valve 58 in first position 74, or the intermediate position 71 between first position 74 and second position 76, generally causes a corresponding increase in pressure within low-pressure supply passage 70. The pressure increase within low-pressure supply passage 70 required to transition from the second operating mode to the first operating mode may be achieved without having to adjust the operating speed of first pump 32 and second pump 34. This may cause the pressure within low-pressure supply passage 70 to exceed the pressure within high-pressure fluid passage 52 of the high-pressure circuit, resulting in a corresponding pressure delta across blocking actuation check valve 106. When the pressure delta exceeds the predetermined pressure delta required to open blocking actuation check valve 106, the pressurized fluid from second pump 34 will commence flowing through blocking actuation passage 100 to the high-pressure circuit, thereby providing additional fluid to satisfy the temporary excess flow requirement of the high-pressure circuit.

With reference to FIG. 4, there may be instances in which the flow requirement of the high-pressure circuit is less than the flow output of first pump 32. When this occurs, fluid distribution system 10 may be operated in the third operating mode (FIG. 4), or in a fifth intermediate operating mode between the second and third operating modes, in which at least a portion of the fluid output from first pump 32 is directed away from the high-pressure circuit and delivered to the low-pressure circuit. The second operating mode may be reinitiated, and the flow output from first pump 32 directed back to the high-pressure circuit, when the flow requirement of the high-pressure circuit again approaches the flow output of first pump 32. The third operating mode may be actuated by arranging line-pressure valve 58 in third position 78, or in an intermediate fifth operating mode when positioned between second position 76 and third position 78, thereby redirecting at least a portion of the flow of pressurized fluid from first pump 32 to the low-pressure circuit and away from the high-pressure circuit.

Figure 7:
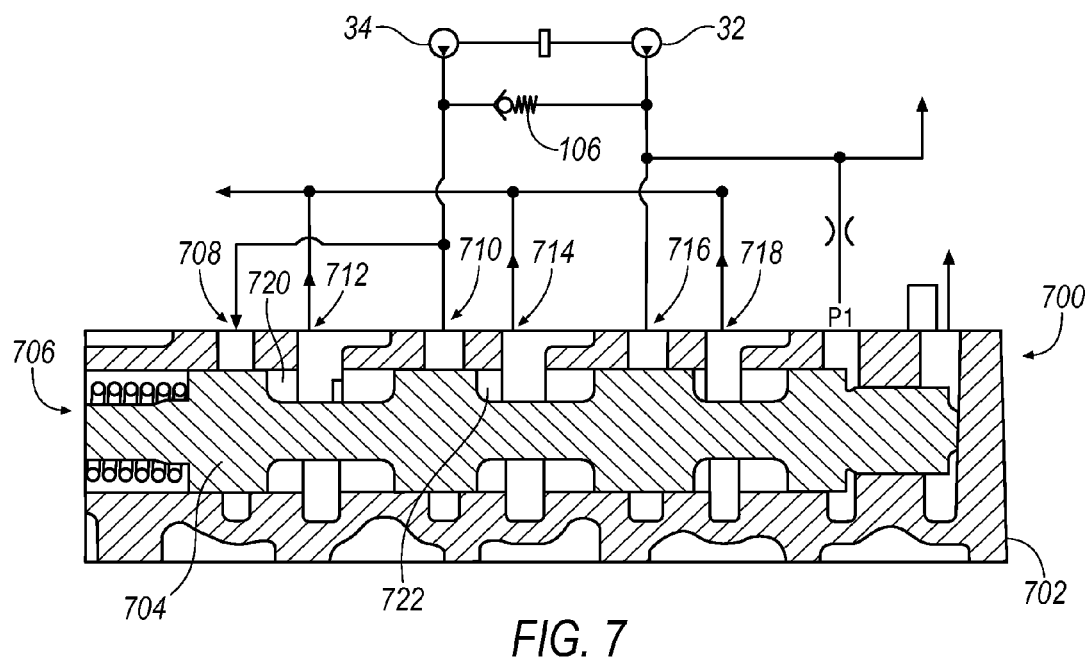
FIG. 7 is a schematic illustration of a line pressure valve corresponding to FIGS. 1 and 2 and having respective inlet and outlet lines illustrated, and having all ports closed.

FIG. 7 shows details of a line pressure valve (LPV) 700, which corresponds to LPV 58 illustrated in FIGS. 1-6. LPV 700 is shown in the context of fluid distribution system 10 and includes, for reference purposes, first pump 32, second pump 34, and BACV 106. LPV 700 includes a valve housing 702 and a spool 704. Valve housing 702 includes a central cavity 706 in which spool 704 is positioned. Spool 704 is axially positionable within central cavity 706, having features as will be further described that selectively connect inlet and outlet ports during a controlled operation of LPV 700.

LPV 700 includes, in fluid correspondence with second pump 34, a first inlet port 708 and a second inlet port 710, as well as a first outlet port 712 and a second outlet port 714. LPV 700 also includes, in fluid correspondence with first pump 32, an inlet port 716 and an outlet port 718. Low pressure pump 34 (LP Pump) is fluidly connected to inlet port 708 and to inlet port 710, and high pressure pump 32 (HP Pump) is fluidly connected to inlet port 716. Outlet ports 712, 714, and 718 are fluidly connectable to respective inlet ports 708, 710, and 716 via spool 704 that is axially moveable to controllably open the connection from inlets 708, 710, and 716 to respective outlets 712, 714, and 718. FIG. 7 illustrates a position of the spool corresponding to FIGS. 1 and 2 above in which all ports are closed.

Inlet ports 708 and 710 correspond with low-pressure inlet port 62 of the above figures, while inlet port 716 corresponds with high-pressure inlet port 60. Outlet ports 712 and 714 correspond with low-pressure outlet or discharge port 66 of the above figures, while outlet port 718 corresponds with high-pressure outlet or discharge port 64. Accordingly, LPV 700, corresponding to line-pressure valve 58 as described above, may be selectively operated in positions 74, 76, and 78 as described in the figures above, and may also be selectively operated in intermediate positions 71 and 73, as well. Spool 704 includes two radial cutouts 720, 722 and valve housing 702 includes the two corresponding inlet ports 708, 710.

In the following FIGS. 8A-8F, LPV 58 is shown having the spool at various positions. An amount of "stroke" varies progressively in the following figures, corresponding to the axial displacement of the spool, which controllably opens access between respective inlet and outlet ports. In the example provided herein, the amount of stroke varies between 0.0 mm (ports fully closed) and 6.0 mm (ports as open as possible). The stroke ranging from 0.0-6.0 mm is merely exemplary and provided for discussion purposes such that the amount of relative stroke may be discussed, however it is contemplated that the disclosed valve and its operation may be used in any size or corresponding amount of stroke, having the function as disclosed herein. Also, inlets, outlets, and other components are identified, where relevant for discussion, as they pertain to the element markings of FIG. 7.

Figure 8A:
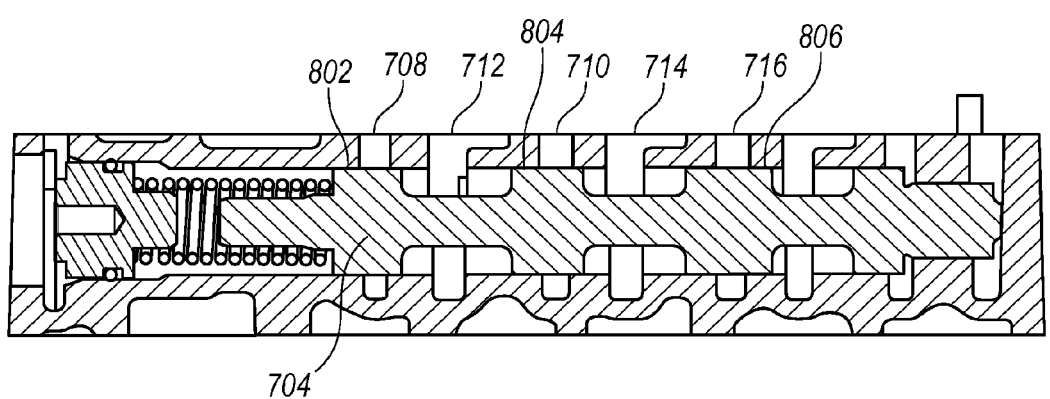
FIG. 8A is an illustration of the line pressure valve of FIG. 7 having all ports close, corresponding to FIGS. 1 and 2.

FIG. 8A indicates the first position, with spool at rest, and all ports closed (Stroke at 0.0 mm), corresponding to FIGS. 1 and 2. FIG. 8A corresponds to the spool in the same position as shown in FIG. 7 above, as well. Accordingly, spool 704 is axially positioned such that inlet ports 708, 710 are blocked by outer circumferences 802, 804 of spool 704 at their respective locations, and inlet port 716 likewise is blocked by outer circumference 806 at its location, as well. Accordingly, inlet lines from each pump 34, 32 are blocked as shown also in FIGS. 1 and 2.

Figure 8B:
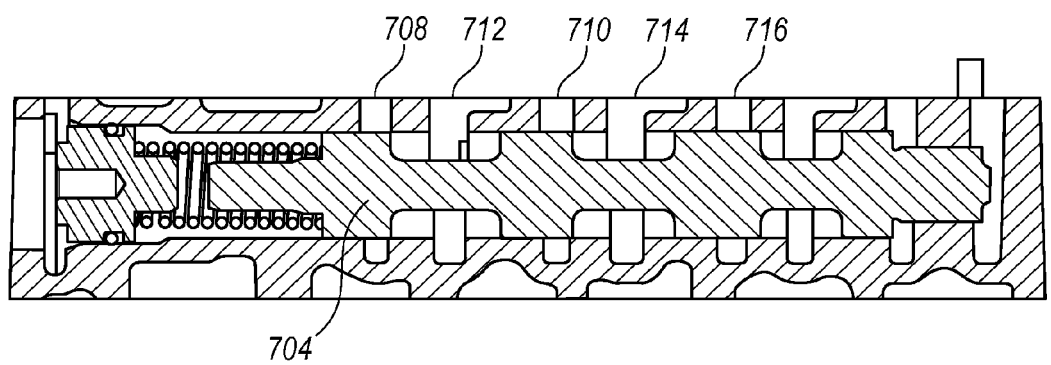
FIG. 8B is an illustration of the line pressure valve of FIG. 7, having the spool positioned in a first intermediate position in which flow is beginning to occur, corresponding to FIG. 5.

FIG. 8B is an illustration of the line pressure valve of FIG. 7, having spool 704 positioned at a first intermediate position between first and second positions in which flow is beginning to occur (Stroke at 1.5 mm), corresponding to FIG. 5 and at position 71. In this case inlet ports 708, 710 are connected line-to-line (just about to open to outlet ports 712, 714) and fluid is just starting to flow in this position, while inlet port 716 is still closed, and corresponds with the fourth operating mode.

Figure 8C:
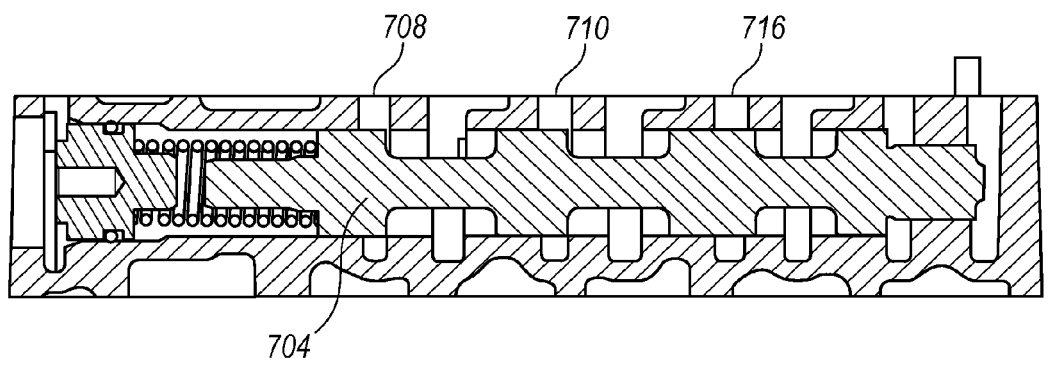
FIG. 8C is an illustration of the line pressure valve of FIG. 7, having the spool positioned at a second position that corresponds to FIG. 3.

FIG. 8C indicates a second position, with inlet ports 708, 710 open while inlet port 716 is still closed (Stroke at 2.0 mm). This position corresponds with second operating mode illustrated in FIG. 3, in which LPV 58 is in position 76.

Figure 8D:
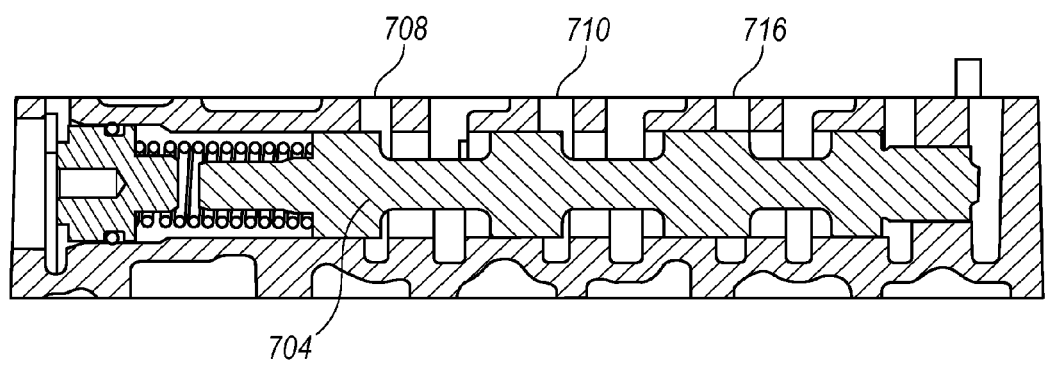
FIG. 8D is an illustration of the line pressure valve of FIG. 7, having the spool positioned corresponding to FIG. 6 in a second intermediate position.

FIG. 8D is an illustration of the line pressure valve of FIG. 7, having spool 704 positioned corresponding to FIG. 6 in a second intermediate position that corresponds with position 73. Inlet ports 708, 710 are open more than in FIGS. 8A-8C, and inlet port 716 is line-to-line (about to open, stroke at 3.0 mm), in which fluid flow is about to occur.

Figure 8E:
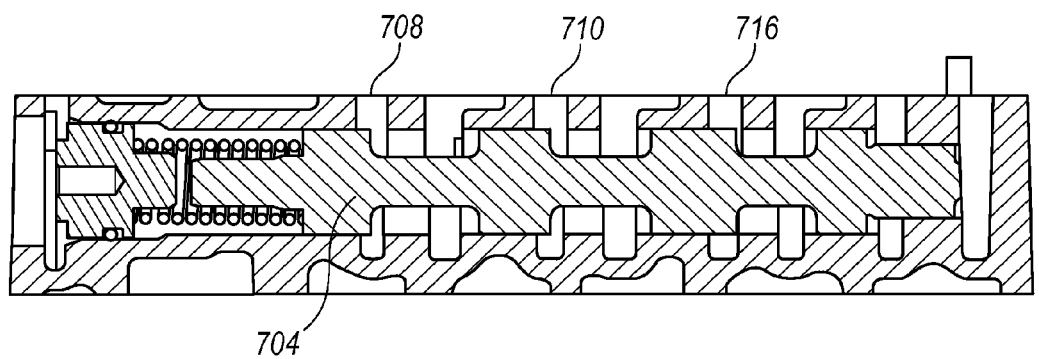
FIG. 8E is an illustration of the line pressure valve of FIG. 7, having the spool positioned at a third position that corresponds to FIG. 4.

FIG. 8E indicates a third position. Inlet ports 708, 710 are open more than in the previous FIGS. 8A-8D, and inlet port 716 is opened enough to almost be stroked beyond a flow metering notch (discussed below). Stroke in this exemplary valve is 4.0 mm. This position corresponds with third operating mode illustrated in FIG. 4, in which LPV 58 is at third position 78.

Figure 8F:
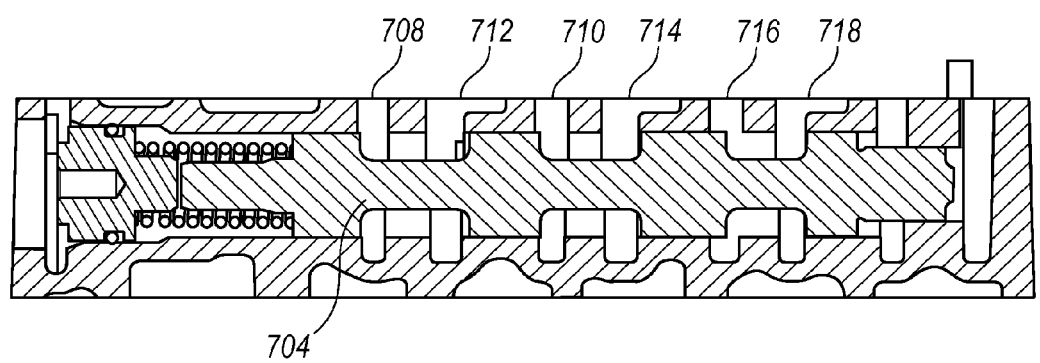
FIG. 8F is an illustration of the line pressure valve of FIG. 7, having the spool positioned "wide open" and corresponding also to FIG. 4.

FIG. 8F indicates a third position that also corresponds with FIG. 4, but stroke in this exemplary valve is 6.0 and all valves are wide open.

Accordingly, pump 32 is fluidly disconnected from the fluid circuit when spool 704 is arranged in a first position (FIGS. 1 and 2, and FIG. 8A), a second position (FIG. 3 and FIG. 8C), and a first intermediate position (FIG. 5 and FIG. 8B) between the first and second positions, and pump 32 is fluidly connected to the fluid circuit when spool 704 is arranged in a third position (FIG. 4 and FIG. 8E) and a second intermediate position (FIG. 6 and FIG. 8D) between the second and third positions. Pump 34 is fluidly disconnected from the fluid circuit when spool 704 is arranged in the first position (FIGS. 1 and 2, and FIG. 8A), and pump 34 is fluidly connected to the fluid circuit when spool 704 is arranged in the second position FIG. 3 and FIG. 8C), the third position (FIG. 4 and FIG. 8E), first intermediate position (FIG. 5 and FIG. 8C), and the second intermediate position (FIG. 6 and FIG. 8E).

Spool 704 includes radial cutouts 720, 722 and valve housing 702 includes the two corresponding inlet ports 708, 710 that define an open position such that, when the spool is arranged in the second position (FIG. 3 and FIG. 8D), the third position (FIG. 4 and FIG. 8E), the first intermediate position (FIG. 5 and FIG. 8B), and the second intermediate position (FIG. 6 and FIG. 8D), and pump 34 is fluidly connected to the fluid circuit via both of the two radial cutouts 720, 722.

When spool 704 is positioned in the first intermediate position (FIG. 5 and FIG. 8B), an edge of the inlet of the valve housing for pump 34 is approximately in line with an edge of a corresponding cutout of the spool such that, despite an approximate line-line position of the two edges, pressure from pump 34 causes fluid to flow to the fluid circuit.

When spool 704 is positioned in the second intermediate position (FIG. 6 and FIG. 8D), an edge of the inlet of the valve housing for the first pump is approximately in line with an edge of a corresponding cutout of the spool such that, despite an approximate line-line position of the two edges, pressure from pump 32 causes fluid to flow to the fluid circuit. Substantially an entire fluid output of pump 34 passes through the line pressure valve when spool 704 is arranged in the second position (FIG. 3 and FIG. 8C), the third position (FIG. 4 and FIG. 8E), and the second intermediate position (FIG. 6 and FIG. 8D).

Figure 9A:
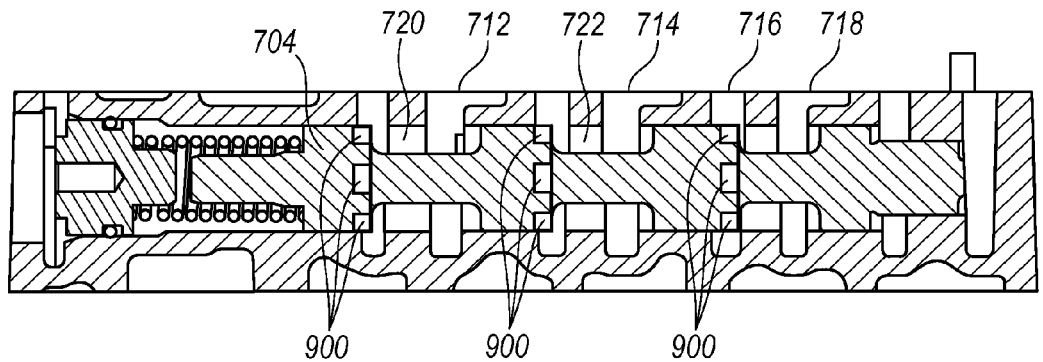
FIG. 9A illustrates flow metering notches positioned in a spool.
Figure 9B:
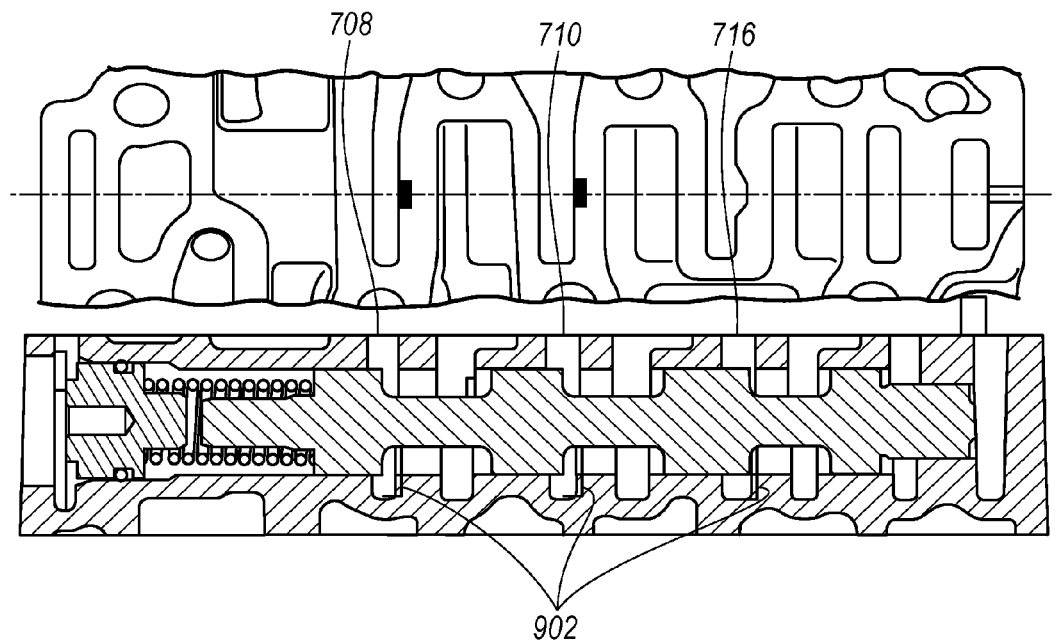
FIG. 9B illustrates flow metering notches positioned in a housing.

FIGS. 9A and 9B illustrate flow metering notches according to two embodiments. The flow metering notches encourage or enhance fluid flow during all positions of operation, but particularly with respect to when the spool is positioned in its intermediate positions as described above. As mentioned, when approximate "line-line" positions occur between housing 702 and spool 704, flow occurs, or just begins to occur, which is caused when pressure from the pumps pressurizes the fluid, causing it to pass from the inlet, to the cavities 720, 722, from which it flows to the respective outlets 712, 714. Similar flow occurs between inlet 716 and outlet 718 due to the presence of notches therein, as well. Thus, disclosed is one or more flow metering notches that correspond to at least one of the inlet ports such that flow through the inlet port is enhanced during axial movement of the spool.

FIG. 9A, in one example, includes flow metering notches 900 that are positioned within spool 704. FIG. 9B, in another example, include flow metering notches 902 that are positioned within housing 702 and within respective inlets 708, 710, and 716. Accordingly, when spool 704 is positioned in its intermediate positions (FIG. 5/FIG. 8B, and FIG. 6/FIG. 8D) flow begins due to the pressure against the spool due to the pressure from the corresponding pumps. However, flow is enhanced in the intermediate positions due to the cutout of one or more flow metering notches 900 that are positioned in the spool 704 (FIG. 9A), and/or one or more flow metering notches 902 that are positioned in the housing 702 (FIG. 9B).

Further, although two flow inlets 708, 710 are illustrated and described, as is one inlet 716 (with corresponding outlets 712, 714, 718), it is contemplated that more or less inlets 708, 712 may be provided that correspond with pump 34, and that more inlets 716 may be provided that correspond with pump 32. That is, the use of two inlets 708, 710 for pump 34, and one inlet 716 for pump 32, are merely exemplary, and that further flow control may be provided in LPV 58 via additional inlets and outlets, as well.

Accordingly, in operation pump 32 is always connected to the HP circuit. The LPV valve regulates whether the first fluid circuit relieves flow to the low pressure circuit. Pump 34 becomes connected to the HP circuit, which occurs when the pump 34 flow becomes blocked from going to the low pressure circuit, and the pump pressure increases. This increases the pressure on the outlet of pump 34. When the pressure on pump side of BACV (pressure at 102) becomes greater than the pressure on the HP side of BACV (pressure at 104) plus the pressure delta to crack BACV, flow from the 2nd pump heads over to the first fluid circuit. As such, the LPV determines whether pump 34 is connected to the LP fluid circuit and how much restriction it creates to get flow from pump 34 to the LP fluid circuit. If the restriction is great enough through the LPV, flow travels through BACV to the first fluid circuit.

It will be appreciated that the exemplary hydraulic system described herein has broad applications. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosed container have been explained and illustrated in exemplary configurations.

It is intended that the scope of the present methods and apparatuses be defined by the following claims. However, it must be understood that the disclosed hydraulic system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosed container should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A line pressure valve comprising:
   a valve housing having a central cavity and a plurality of inlet and outlet ports; and
   a spool positioned within the central cavity and axially displaceable therein, the spool having a plurality of radial cutouts that fluidly connect respective inlet and outlet ports based on an axial position of the spool with respect to the valve housing;
   wherein:
      first and second pumps are fluidly connectable and disconnectable respectively to and from the fluid circuit based on the axial position of the spool via the inlet and outlet ports;
      the first pump is configured to be fluidly disconnected from the fluid circuit when the spool is arranged in a first, a second, and a first intermediate position between the first and second positions, and the first pump is configured to be fluidly connected to the fluid circuit when the spool is arranged in a third position and a second intermediate position between the second and third positions; and
      the second pump is configured to be fluidly disconnected from the fluid circuit when the spool is arranged in the first position, and the second pump is configured to be fluidly connected to the fluid circuit when the spool is arranged in the second position, the third position, the first intermediate position, and the second intermediate position.

2. The line pressure valve of claim 1, wherein the spool includes two radial cutouts and the valve housing includes two corresponding inlet ports that define an open position such that, when the spool is arranged in the second position, the third position, the first intermediate position, the second intermediate position, the second pump is fluidly connected to the fluid circuit via both of the two radial cutouts.

3. The line pressure valve of claim 1, wherein when the spool is positioned in the first intermediate position, an edge of the inlet of the valve housing for the second pump is approximately in line with an edge of a corresponding cutout of the spool such that, despite an approximate line-line position of the two edges, pressure from the second pump causes fluid to flow to the fluid circuit.

4. The line pressure valve of claim 3, wherein when the spool is positioned in the second intermediate position, an edge of the inlet of the valve housing for the first pump is approximately in line with an edge of a corresponding cutout of the spool such that, despite an approximate line-line position of the two edges, pressure from the first pump causes fluid to flow to the fluid circuit.

5. The line pressure valve of claim 4, further comprising one or more flow metering notches that correspond to at least one of the inlet ports such that flow through the inlet port is enhanced during axial movement of the spool.

6. The line pressure valve of claim 5, wherein the one or more flow metering notches are cutouts in the spool.

7. The line pressure valve of claim 5, wherein the one or more flow metering notches are cutouts in the valve housing.

8. The line pressure valve of claim 1, wherein substantially an entire fluid output of the second pump passes through the line pressure valve when the spool is arranged in the second position, the third position, and the second intermediate position.

9. The line pressure valve of claim 1, wherein the line pressure valve is disposed in a fluid path between the first pump and the second fluid circuit and the second pump and the second fluid circuit.

10. A hydraulic system comprising:
    a first fluid circuit;
    a second fluid circuit;
    a first pump fluidly connected to the first fluid circuit and selectively connectable to the second fluid circuit;
    a second pump selectively fluidly connectable to the first fluid circuit and the second fluid circuit;
    a line pressure valve comprising:
       a valve housing having a central cavity and a plurality of inlet and outlet ports; and
       a spool positioned within the central cavity and axially displaceable therein, the spool having a plurality of radial cutouts that fluidly connect respective inlet and outlet ports based on an axial position of the spool with respect to the valve housing;
    wherein:
       the first and second pumps are fluidly connectable and disconnectable respectively to and from the first and second fluid circuits based on the axial position of the spool via the inlet and outlet ports;
       the first pump is configured to be fluidly disconnected from the second fluid circuit when the spool is arranged in a first, a second, and a first intermediate position between the first and second positions, and the first pump is configured to be fluidly connected to the second fluid circuit when the spool is arranged in a third position and a second intermediate position between the second and third positions; and
       the second pump is configured to be fluidly disconnected from the second fluid circuit when the spool is arranged in the first position, and the second pump is configured to be fluidly connected to the second fluid circuit when the spool is arranged in the second position, the third position, the first intermediate position, and the second intermediate position.

11. The hydraulic system of claim 10, wherein the spool includes two radial cutouts and the valve housing includes two corresponding inlet ports that define an open position such that, when the spool is arranged in the second position, the third position, the first intermediate position, and the second intermediate position, the second pump is fluidly connected to the second fluid circuit via both of the two radial cutouts.

12. The hydraulic system of claim 10, wherein when the spool is positioned in the first intermediate position, an edge of the inlet of the valve housing for the second pump is approximately in line with an edge of a corresponding cutout of the spool such that, despite an approximate line-line position of the two edges, pressure from the second pump causes fluid to flow to the second fluid circuit.

13. The hydraulic system of claim 12, wherein when the spool is positioned in the second intermediate position, an edge of the inlet of the valve housing for the first pump is approximately in line with an edge of a corresponding cutout of the spool such that, despite an approximate line-line position of the two edges, pressure from the first pump causes fluid to flow to the second fluid circuit.

14. The hydraulic system of claim 13, further comprising one or more flow metering notches that correspond to at least one of the inlet ports such that flow through the inlet port is enhanced during axial movement of the spool.

15. The hydraulic system of claim 14, wherein the one or more flow metering notches are cutouts in the spool.

16. The hydraulic system of claim 14, wherein the one or more flow metering notches are cutouts in the valve housing.

17. The hydraulic system of claim 10, wherein substantially an entire fluid output of the second pump passes through the line pressure valve when the spool is arranged in the second position, the third position, and the second intermediate position.

18. The hydraulic system of claim 10, wherein the line pressure valve is disposed in a fluid path between the first pump and the second fluid circuit and the second pump and the second fluid circuit.

* * * * *